United States Patent Office 3,460,947
Patented Aug. 12, 1969

3,460,947
SILVER HALIDE EMULSIONS CONTAINING CHAIN-SUBSTITUTED CYANINE DYES
Geoffrey Ernest Ficken, Ilford, England, assignor to Ilford Limited, Ilford, England, a British company
No Drawing. Filed Aug. 9, 1965, Ser. No. 478,469
Claims priority, application Great Britain, Aug. 14, 1964, 33,244/64
Int. Cl. G03c 1/10
U.S. Cl. 96—106                        8 Claims

ABSTRACT OF THE DISCLOSURE

Silver halide emulsions containing at least one of the dyestuffs of the formula

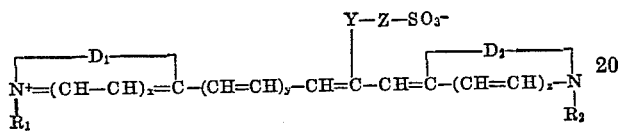

wherein $R_1$ and $R_2$ are alkyl groups, Y is selected from the class consisting of oxygen and sulphur, Z is a saturated alkylene group containing up to 6 carbon atoms in the chain, each of $x$, $y$ and $z$ are selected from 0 and 1, and $D_1$ and $D_2$ are each the residue of a heterocyclic nucleus selected from the group consisting of thiazoles, oxazoles, selenazoles and their polycyclic homologues of the benzene and naphthalene series, pyridine and its polycyclic homologues, indolenines, diazoles, thiazolines and diazines.

---

This invention relates to cyanine dyestuffs, to their production and to photographic silver halide emulsions containing the said dyestuffs as optical sensitising agents.

According to the present invention there are provided dyestuffs of the general Formula I:

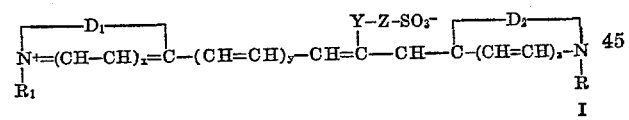

where $R_1$ and $R_2$ are alkyl groups. Y is an oxygen or sulphur atom, Z is a saturated alkylene group containing up to 6 carbon atoms in the chain, $x$, $y$ and $z$ are the same or different and are each nought or one, and $D_1$ and $D_2$ are each the residue of a five-membered or six-membered heterocyclic nucleus.

In the foregoing formula $R_1$ and $R_2$ are preferably methyl, ethyl, propyl or butyl groups but may be higher alkyl groups.

$D_1$ and $D_2$ may each be the residue of any five-membered or six-membered heterocyclic ring system including thiazoles, oxazoles, selenazoles and their polycyclic homologues such as those of the benzene and naphthalene series; pyridine and its polycyclic homologues, such as quinoline and α- and β-naphthoquinolines; indolenines; diazoles (e.g. 1:3:4-thiadiazole); thiazolines; diazines (e.g., pyrimidines and quinazolines). The polycyclic compounds of the series may be substituted in the carbocyclic rings with one or more groups such as alkyl, aryl, alkoxy and methylene dioxy groups, or by halogen atoms.

According to a further feature of the present invention there is provided a process for the production of a dyestuff of general Formula I which comprises reacting a compound of the general Formula II:

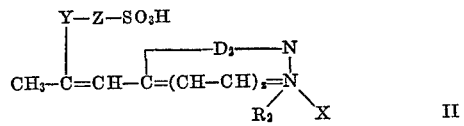

or the corresponding zwitterion of the general Formula III:

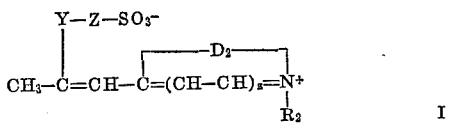

where X is an anion and the other symbols have the values assigned to them above, with a compound of the general Formula IV:

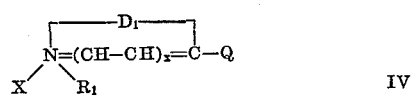

where Q is an alkylthio, alkylthiovinyl or acetanilidovinyl group and the other symbols have the meanings assigned to them above. X may be any acid radical, for example halide (chloride, bromide, iodide), sulphate, sulphamate, perchlorate or p-toluene sulphonate.

The process is preferably carried out by heating the reagents together in the presence of a basic condensing agent, e.g., an inorganic basic agent such as sodium acetate, or an organic agent such as pyridine or triethylamine.

An alternative process for the production of dyes of Formula I where Y is sulphur comprises reacting a compound of the Formula V:

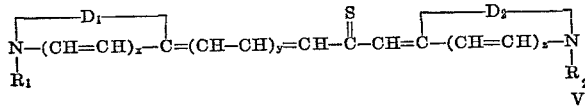

with a sultone of the Formula VI:

or with a halo-alkane-sulphonic acid of the Formula VII

where the symbols have the meaning assigned to them above and Hal is a halogen atom.

The dyestuffs differ from dyestuffs known in the art fundamentally in the presence of the sulphonic acid residue. They have been found to be very strong sensitisers for photographic silver halide emulsions, including silver bromide, chloride, chlorobromide and iodobromide emulsions. For this purpose they are used in the same manner and amount as cyanine sensitising dyes known per se. The invention accordingly includes such emulsions, particularly gelatino silver halide photographic emulsions, containing one or more of the dyestuffs of general Formula I in sensitizing amount.

The following examples will serve to illustrate the invention:

EXAMPLE 1

Anhydro-bis-(3-ethyl-2-benzothiazole) β-3-sulphopropoxytrimethincyanine hydroxide A mixture of 2-acetylmethylene-3-ethylbenzothiazoline (1.1 g.) and 1,3-propanesultone (0.6 ml.) was heated at 145° for 1 hour. The cooled melt was dissolved in ethanol (10 ml.) and the solution refluxed for 1 hour with 3-ethyl-2-ethylthiobenzothiazolium toluene-p-sulphonate (3.0 g.) and triethylamine (1.4 ml.). The dye which separated was collected, washed with cold ethanol, and crystallised from methanol, when it formed scarlet-red plates, M.P. 194–195°.

The dye extends the sensitivity of a silver iodobromide photographic emulsion to 5600 A., with maxima at 5,250 and 5,550 A.

EXAMPLE 2

Anhydro - (3 - ethyl - 2 - benzothiazole) (5,6-dimethoxy-3-methyl - 2 - benzothiazole) β - 3 - sulphopropoxytrimethincyanine hydroxide The method of Example 1 was followed, but using 5,6-dimethoxy-3-methyl - 2 - methylthiobenzothiazolium toluene-p-sulphonate. The dye formed red needles, M.P. 206–207°.

The dye extends the sensitivity of a silver iodobromide photographic emulsion to 6200 A. with a maximum at 5,950 A.

EXAMPLE 3

Anhydro-(3-ethyl-2-benzothiazole)(1-ethyl-2-quinoline) β-3-sulphopropoxy-trimethincyanine hydroxide The method of Example 1 was used, but with 1-ethyl-2-methylthio-quinolinium toluene-p-sulphonate (1.9 g.). The dye was obtained as bronze-coloured crystals, M.P. 179–181°, by crystallization from ethanol.

The dye extends the sensitivity of a silver iodobromide photographic emulsion to 6000 A., with a maximum at 5,750 A.

EXAMPLE 4

Anhydro-bis-(3-ethyl-2-benzothiazole)-β-3-sulphopropylthiotrimethincyanine hydroxide A mixture of 1,3-bis-(3-ethyl-2-benzothiazolinylidene)-propan-2-thione (0.5 g.), 1,3-propanesultone (1.0 ml.) and chloroform (10 ml.) was refluxed for 1½ hours. The tar remaining on evaporation of the solvent was dissolved in methanol, and the solution was treated with dilute aqueous ammonia. The solid which separated was collected, washed with cold water and hot benzene, and crystallised from ethanol to give the dye, M.P. 195–197°.

EXAMPLE 5

Anhydro-bis-(3-ethyl-2-benzothiazole) β-3-sulphopropoxypentamethincyanine hydroxide 2-Acetylmethylene-3-ethylbenzothiazoline (1.1 g.) was quaternised with 1,3-propanesultone (0.6 g.) as in Example 1. The product and 3-ethyl-2-w-ethylthiovinylbenzothiazolium iodide (1.9 g.) were refluxed together in ethanol (10 ml.) containing triethylamine (1.0 ml.) for 30 minutes. The solid which separated was collected, washed with cold ethanol, and crystallised from methanol. The dye was obtained as deep blue needles, M.P. 202–203°.

The dye imparts a new band of sensitivity to a silver iodobromide photographic emulsion from 6,200 to 6,750 A., with a maximum at 6,600 A.

Using the method of Example 1, the following Examples 6 to 8 were obtained from 2-acetylmethylene-3-ethylbenzothiazoline:

EXAMPLE 6

Anhydro - (3-ethyl-2-benzothiazole) (5-methoxy-3-methyl-2 - benzothiazole) β-3-sulphopropoxytrimethincyanine hydroxide The dye formed red needles, M.P. 210° (decomp.), after boiling out with methanol.

The dye extends the sensitivity of a silver iodobromide photographic emulsion to 5,700 A., with a maximum at 5,250 A.

EXAMPLE 7

Anhydro - (3 - ethyl - 2 - benzothiazole) (5 - chloro - 3-methyl - 2 - benzothiazole) β - 3 - sulphopropoxytrimethincyanine hydroxide The dye formed red crystals, M.P. 185–186° (decomp.), after crystallization from methanol.

The dye extends the sensitivity of a silver iodobromide photographic emulsion to 5,650 A., with a maximum at 5,300 A.

EXAMPLE 8

Anhydro - (3 - ethyl - 2 - benzothiazole) (3-ethyl-5,6-dimethoxy - 2 - benzothiazole) β - 3 - sulphopropoxytrimethincyanine hydroxide The dye was obtained as red crystals, M.P. 176° (decomp.) by crystallization from ethanol.

The dye extends the sensitivity of a silver iodobromide photographic emulsion to 5,850 A., with a maximum at 5,700 A.

EXAMPLE 9

Anhydro - (3 - ethyl - 5 - methyl - 2 - benzoselenazole) (5,6 - dimethoxy - 3 - methyl - 2 - benzothiazole) β - 3- sulphopropoxytrimethincyanine hydroxide A mixture of 2-acetylmethylene-3-ethyl-5-methylbenzoselenazoline (1.4 g.) and 1,3-propanesultone (0.7 g.) was heated at 140° for 15 minutes.

The product and 5,6-dimethoxy-3-methyl-2-methylthiobenzothiazolium p-toluenesulphonate (2.2 g.) were refluxed together in ethanol (10 ml.) containing triethylamine (1.4 ml.) for 30 minutes. The resulting solution was treated with a little dilute aqueous ammonia, and the solid which separated was filtered off and washed with water and benzene. Crystallization from methanol gave the dye as purple crystals, M.P. 257–259° (decomp.).

EXAMPLE 10

Anhydro - (3 - ethyl - 2 - benzothiazole) (1 - methyl - 2-naphtho(1,2d)thiazole) β - 3 - sulphopropoxytrimethincyanine hydroxide 2-Acetylmethylene-3-ethylbenzothiazoline (2.2 g.) was reacted with 1,3-propanesultone as in Example 1. The product was refluxed in ethanol (20 ml.) with 1-methyl-2 - methylthionaphtho[1,2d]thiazolium p-toluenesulphonate (prepared by heating 2-methylthio-β-naphthothiazole (2.3 g.) and methyl p-toluenesulphonate (1.9 g.) at 165° for 2 hours) and triethylamine (2.8 ml.). After 1 hour the solution was cooled and treated with dilute aqueous ammonia. The solid which separated was collected and washed successively with water, ether and ethanol. After boiling out with methanol the dye was obtained as red crystals, M.P. 216–218°.

EXAMPLE 11

Anhydro - (3 - ethyl - 2 - benzothiazole) (3 - methyl - 5-phenyl - 2 - benzoxazole) β - 3 - sulphopropoxytrimethincyanine hydroxide A mixture of 2-acetylmethylene-3-ethylbenzothiazoline (1.1 g.) and 1,3-propanesultone (3.5 g.) was heated at 145° for 1 hour. 3-Methyl-5-phenyl-2-benzoxazolinethione (1.8 g.) was added and heating at the same temperature was continued for a further 2 hours.

Pyridine was added to the melt, and the mixture was refluxed for 15 minutes. The solution was cooled and diluted with water, and the solid was filtered off, washed with water and benzene, and boiled out with methanol. The dye formed red crystals, M.P. 235–237°.

EXAMPLE 12

Anhydro - (3 - ethyl - 2 - benzothiazole) (5,6 - dimethoxy-3-methyl-2-benzothiazole) β-3-sulphopropylthiotrimethincyanine hydroxide A mixture of 3-ethyl-2-thioacetylmethylenebenzothiazoline (2.35 g.) and 1,3-propanesultone (1.4 g.) was heated at 100° for 30 minutes. The resulting quaternary salt was refluxed in ethanol (20 ml.) with 5,6-dimethoxy-3-methyl-2-methylthiobenzothiazolium p-toluenesulphonate (5.3 g.) and triethylamine (2.8 ml.). After 30 minutes the solution was cooled and treated with dilute aqueous ammonia. The tar which separated was washed with water, and then stirred with aceton, when it hardened. The dye was crystallized from ethanol, when it formed deep blue crystals, M.P. 261–263°.

EXAMPLE 13

Anhydro - (3 - ethyl - 2 - benzothiazole)(5 - chloro - 3-methyl - 2 - benzothiazole) β - 4 - sulphobutylthiotrimethincyanine hydroxide A mixture of 3-ethyl-2-thioacetylmethylenebenzothiazoline (2.35 g.) and 1,4-butanesultone (2.0 ml.) was heated at 150° for 40 minutes. The product and 5-chloro-3 - methyl - 2 - methylthiobenzothiazolium p - toluenesulphonate (4.1 g.) were refluxed in ethanol (20 ml.) with triethylamine (2.8 ml.) for 30 minutes. Addition of dilute aqueous ammonia to the solution caused the separation of a tar, which was hardened by washing with water and then acetone. Crystallization from ethanol yielded the dye as green crystals, M.P. 190–192°.

EXAMPLE 14

Anhydro - bis - (3 - ethyl - 2 - benzothiazole) β - 2 - sulphoethylthiotrimethincyanine hydroxide A mixture of 1,3-bis-(3-ethyl-2-benzothiazolinylidene)-propan-2-thione (1.0 g.) and bromoethanesulphonic acid (1.0 g.) was heated for 2 hours at 140°. The cooled product was boiled with ethanol and the mixture treated with dilute aqueous ammonia. The solid was filtered off and washed with water and ether. Crystallisation from methanol gave the dye as green crystals, M.P. 333–334° (decomp.).

I claim as my invention:

1. A silver halide photographic emulsion which contains at least one dyestuff of the formula

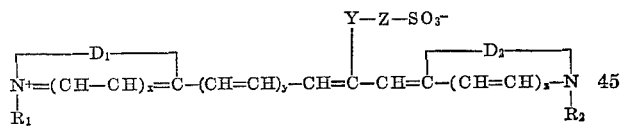

wherein $R_1$ and $R_2$ are alkyl groups, Y is selected from the class consisting of oxygen and sulphur, Z is a saturated alkylene group containing up to 6 carbon atoms in the chain, each of $x$, $y$, and $z$ are selected from 0 and 1, and $D_1$ and $D_2$ are each the residue of a heterocyclic nucleus selected from the group consisting of thiazoles, selenazoles and their polycyclic homologues of the benzene and naphthalene series, pyridine and its polycyclic homologues, indolenines, diazoles, thiazolines and diazines.

2. The silver halide photographic emulsion of claim 1 wherein $R_1$ and $R_2$ are each selected from the group consisting of methyl, ethyl, propyl and butyl.

3. The silver halide photographic emulsion of claim 1 wherein said dyestuff is anhydro(3-ethyl-2-benzothiazole) (5,6-dimethoxy-3-methyl-2-benzothiazole) β - 3 - sulphopropoxytrimethincyanine hydroxide.

4. The silver halide photographic emulsion of claim 1 wherein said dyestuff is anhydro-(3-ethyl-2-benzthiazole) (3 - ethyl-5,6 - dimethoxy-2-benzothiazole) β - 3 - sulphopropoxytrimethincyanine hydroxide.

5. The silver halide photographic emulsion of claim 1 wherein said dyestuff is anhydro-(3 - ethyl - 5 - methyl - 2-benzoselenazole)(5,6 - dimethoxy - 3 - methyl - 2 - benzothiazole) β-3-sulphopropoxytrimethincyanine hydroxide.

6. The silver halide photographic emulsion of claim 1 wherein said dyestuff is anhydro-(3-ethyl-2-benzothiazole) (1-methyl-2-naphtho (1,2d) thiazole)β-3-sulphopropoxytrimethincyanine hydroxide.

7. The silver halide photographic emulsion of claim 1 wherein said dyestuff is anhydro-(3-ethyl-2-benzothiazole) (5,6 - dimethoxy-3-methyl-2-benzothiazole) β - 3 - sulphopropylthiotrimethincyanine hydroxide.

8. The silver halide photographic emulsion of claim 1 wherein the silver halide is silver iodobromide.

References Cited

UNITED STATES PATENTS

| | | | |
|---|---|---|---|
| 2,503,776 | 4/1950 | Sprague | 96—106 |
| 3,148,187 | 9/1964 | Haseltine | 96—106 |
| 3,352,857 | 11/1967 | Brooker et al. | 96—106 |
| 3,403,149 | 9/1968 | Ficker | 96—106 |

J. TRAVIS BROWN, Primary Examiner

U.S. Cl. X.R.

260—240